US009549356B2

(12) United States Patent
Hou et al.

(10) Patent No.: US 9,549,356 B2
(45) Date of Patent: Jan. 17, 2017

(54) METHOD AND DEVICE FOR SHUNTING IP STREAM DURING 3GPP ACCESS SWITCHING

(71) Applicant: China Academy of Telecommunications Technology, Beijing (CN)

(72) Inventors: Yunjing Hou, Beijing (CN); Juan Zhang, Beijing (CN); Hui Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/417,671

(22) PCT Filed: Jun. 25, 2013

(86) PCT No.: PCT/CN2013/077854
§ 371 (c)(1),
(2) Date: Jan. 27, 2015

(87) PCT Pub. No.: WO2014/015734
PCT Pub. Date: Jan. 30, 2014

(65) Prior Publication Data
US 2015/0223134 A1 Aug. 6, 2015

(30) Foreign Application Priority Data

Jul. 27, 2012 (CN) .......................... 2012 1 0266249

(51) Int. Cl.
*H04W 4/00* (2009.01)
*H04W 36/22* (2009.01)
(Continued)

(52) U.S. Cl.
CPC ......... *H04W 36/22* (2013.01); *H04W 36/0011* (2013.01); *H04W 36/14* (2013.01); *H04W 84/12* (2013.01)

(58) Field of Classification Search
USPC ........................ 370/329, 330, 331, 333, 338
See application file for complete search history.

(56) References Cited

U.S. PATENT DOCUMENTS

2007/0218906 A1  9/2007 Melia et al.
2012/0069817 A1  3/2012 Ling et al.
(Continued)

FOREIGN PATENT DOCUMENTS

CN    101635966    1/2010
CN    101801055    8/2010
(Continued)

OTHER PUBLICATIONS

3rd Generation Partnership Project; Technical Specification Group Services and System Aspects; Optimized Offloading to WLAN in 3GPP-RAT mobility; (Release 12), 3GPP Standard; 3GPP TR 23.890, 3rd Generation Partnership Project (3GPP), Mobile Competence Centre; 650, Route Des Lucioles; F-06921 Sophia-Antipolis Cedex; France, vol. SA WG2, No. VO.1.0, Oct. 4, 2012, pp. 17, XP050650307.
(Continued)

*Primary Examiner* — Zewdu A Beyen
(74) *Attorney, Agent, or Firm* — Foley & Lardner LLP; James F. Ewing; Paul M. H. Pua

(57) ABSTRACT

The present application relates to the technology of communications. Disclosed are a method and device for shunting IP streams during 3GPP access switching; after having received a command for 3GPP access switching transmitted by a source 3GPP access device, a user equipment (UE) determines the IP streams to be transferred, and then per- (Continued)

forms 3GPP access switching and IP stream transferring at the same time, thus improving IP stream transferring efficiency. In addition, the IP streams to be transferred contain an IP stream capable of being transmitted via WLAN access after a target 3GPP access device fails to allocate resources to a bearers for transmitting the IP stream, thereby avoiding service interruption due to bearer loss, and thus improving the QoS ensurance for the service.

10 Claims, 7 Drawing Sheets

(51) Int. Cl.
*H04W 36/14* (2009.01)
*H04W 36/00* (2009.01)
*H04W 84/12* (2009.01)

(56) References Cited

U.S. PATENT DOCUMENTS

2012/0294276 A1* 11/2012 Jaiswal ............... H04W 36/023
370/331
2013/0170435 A1* 7/2013 Dinan ................... H04L 45/50
370/328

FOREIGN PATENT DOCUMENTS

WO    WO-2011/120577 A1   10/2011
WO    WO-2011/132728      10/2011

OTHER PUBLICATIONS

CATT: "Alternative Solution for Scenario 1&2 of Key Issue 2", 3GPP Draft; S2-130242 Solution of KI2 R1, 3rd Generation Partnership Project (3GPP), Mobile Competence Centre; 650, Route Des Lucioles; F-06921 Sophia-Antipolis Cedex; France, vol. SA WG2, no. Prague, Szech Republic; 20130128-20130201 Jan. 22, 2013, XP050684792, Retrieved from the Internet: URL:http://www.3gpp.org/ftp/tsg_sa/WG2_Arch/TSGs2_95_Prague/Docs/.
Extended European Search report for EP 13823309.3 dated Jun. 24, 2015.
Jinho Kim et al.: "Mobile-initiated with network-controlled IP flow mobility mechanism for multi-interface mobile node", Consumer Electronics (ICCE), 2012 IEEE International Conference on, IEEE, Jan. 13, 2012, pp. 522-523, XP032125027.
Jinho Kim et al: "An optimized seamless IP flow mobility management architecture for traffic offloading", 2012 IEEE Network Operations and Management Symposium (NOMS 2012): Maui, Hawaii, USA, Apr. 16-20, 2012, IEEE, Piscataway, NJ, Apr. 16, 2012, pp. 229-236, XP032448655, DOI: 10.1109/NOMS.2012.6211903.
3GPP SA WG2 Meeting #91, S2-122231, "Proposed WORM scenario on 3GPP PS Handover," Research in Motion UK, May 21-25, 2012, Kyoto, Japan.
3GPP SA WG2 Meeting #91, S2-122050, "Proposed scenario for the study on optimizing offloading to WLAN in 3GPP RAT mobility," LG Electronics, May 21-25, 2012, Kyoto, Japan.
Office Action for Chinese Patent Application No. 201210266249 mailed Dec. 21, 2015 (including English summary).
International Search Report and Written Opinion for PCT International Application No. PCT/CN2013/077854, mailed on Oct. 17, 2013.

* cited by examiner

METHOD AND DEVICE FOR SHUNTING IP STREAM DURING 3GPP ACCESS SWITCHING

This application is a US National Stage of International Application No. PCT/CN2013/077854, filed on Jun. 25, 2013, designating the United States, and claiming the benefit of Chinese Patent Application No. 201210266249.8, filed with the Chinese Patent Office on Jul. 27, 2012 and entitled "Method and device for distributing IP traffic during 3GPP inter-RAT handover", which is hereby incorporated by reference in its entirety.

FIELD OF THE INVENTION

The present invention relates to the field of communications and particularly to a method and device for distributing IP traffic during 3GPP inter-Radio Access Technology (RAT) handover.

BACKGROUND OF THE INVENTION

At the Meeting #90 of the Third Generation Partnership Project Service and Systems Aspects Working Group 2 (3GPP SA WG2), a work item for Study on Optimized Offloading to WLAN in 3GPP-RAT mobility (WORM) has been approved to focus on investigate routing optimization by moving one or more Internet Protocol (IP) flows of a User Equipment (UE) to a Wireless Local Area Network (WLAN) access according to an Access Network Discovery and Selection Function (ANDSF) policy (relative priorities of a 3GPP access and the WLAN access) during the 3GPP inter-RAT handover. The work item is concerned with the technologies of the 3GPP inter-RAT handover of the UE, IP flow mobility and the ANDSF, an introduction of which will be given below respectively.

(I) 3GPP Inter-RAT Handover of a UE

A 3GPP access refers to a radio access network, e.g., a UTRAN, an E-UTRAN, etc., deployed with an access technology defined by the international standardization organization 3GPP. A 3GPP access device refers to a radio access device, e.g., a Node B, an evolved Node B (eNB), etc., manufactured as per the specification defined by the 3GPP; and a source 3GPP access device refers to a 3GPP access device with which the UE is connected before handover. 3GPP inter-RAT handover of UE has been introduced in details in the 3GPP TS 23.401, and this procedure will be introduced below in details by way of an example where a UE is handed over from an Evolved Universal Terrestrial Radio Access Network (E-UTRAN) to a Universal Terrestrial Radio Access Network (UTRAN) Iu mode:

The procedure in which the UE is handed over from the E-UTRAN to the UTRAN Iu mode includes a handover preparation phase and a handover execution phase, and the handover preparation phase as illustrated in FIG. 1 includes:

In the step S101, a source eNB initiates a procedure of 3GPP inter-RAT handover so as to hand the UE over to a target access network, i.e., the UTRAN Iu mode;

In the step S102, the source eNB sends a Handover Required message to a source Mobility Management Entity (MME) to request allocation of a resource for the UE in a target Radio Network Controller (RNC), a target Serving General Packet Radio Service (GPRS) Support Node (SGSN) and a serving gateway (GW);

In the step S103, the source MME sends a Forward Relocation Request message to the target SGSN to initiate a handover resource allocation procedure;

In the step S104, the target SGSN determines whether to relocate the serving GW for the UE, and if the serving GW needs to be relocated, then the target SGSN sends a Create Session Request message to the target serving GW per Packet Data Network (PDN) connection;

In the step S104a, the target serving GW allocates its local resource for the PDN connection and returns a Create Session Response message to the target SGSN;

In the step S105, the target SGSN sends a Relocation Request message to the target RNC to request the target RNC for allocation of radio resource for the UE;

In the step S105a, the target RNC allocates resource and returns to the target SGSN a Relocation Request Acknowledge message carrying information on Radio Access Bearers (RABs) established by the target RNC;

In the step S106, if Indirect Forwarding and Direct Tunnel is adopted and a serving GW is relocated, then the target SGSN sends a Create Indirect Data Forwarding Tunnel Request message to the target serving GW;

In the step S106a, the target serving GW returns a Create Indirect Data Forwarding Tunnel Response message to the target SGSN;

In the step S107, the target SGSN sends a Forward Relocation Response message to the source MME;

In the step S108, if Indirect Forwarding is adopted, the source MME sends a Create Indirect Data Forwarding Tunnel Request message to the serving GW used for Indirect Forwarding; and In the step S108a, the serving GW returns a Create Indirect Data Forwarding Tunnel Response message to the source MME.

The target network side allocates the desired resource for the UE at the end of the handover preparation phase, and the UE is handed over from the E-UTRAN to the UTRAN Iu mode in the handover execution phase as illustrated in FIG. 2 including:

In the step S201, the source MME sends a Handover Command message to the source eNB at the end of the handover preparation phase;

In the step S202, the source eNB sends an HO from E-UTRAN Command message to the UE to instruct the UE to execute a handover to the target access network;

In the step S203, the UE moves to the target UTRAN Iu (3G) system and executes the handover according to parameters in the HO from E-UTRAN Command message, which is a UTRAN Iu access procedure;

In the step S204, the target RNC sends a Relocation Complete message to the target SGSN after the UE and the target RNC exchange successfully an RNC-ID and a Serving-Radio Network Temporary Identifier (S-RNTI). This message indicates that the UE has moved from the E-UTRAN to the RNC;

In the step S205, after the UE has arrived to the target side, the target SGSN sends a Forward Relocation Complete Notification message to the source MME to inform the source MME that the UE has arrived to the target side, and the source MME starts a timer upon reception of the message;

In the step S206, the target SGSN starts a timer upon reception of a Forward Relocation Complete Acknowledge message;

In the step S207, the target SGSN sends a Modify Bearer Request message to the target serving GW to complete the handover procedure;

In the step S208, the target serving GW sends a Modify Bearer Request message to a Packet Data Network (PDN) gateway (GW) to modify a context of the UE;

In the step S208a, if the serving GW is relocated, then the PDN GW updates the context of the UE and returns a Modify Bearer Response message to the target serving GW;

In the step S209, the target serving GW sends a Modify Bearer Response message to the target SGSN to indicate that the user plane switch procedure has been completed; and In the step S210, when the UE recognizes that its current Routing Area is not registered with the network, or when a Temporary Identity used in Next update (TIN) of the UE indicates a Globally Unique Temporary Identifier (GUTI), the UE initiates a Routing Area Update (RAU) procedure;

In the step S211, after the timer started by the source MME in the step S205 expires, the source MME sends a Release Resource message to the source eNB, and if the serving GW serving the UE is changed, then the source MME sends a Delete Session Request message to the source serving GW. The source serving GW deletes the context of the UE and then sends a Delete Session Response message to the source MME;

In the step S212, if Indirect Forwarding is used, then after the timer started by the source MME in the step S205 expires, the source MME sends a Delete Indirect Data Forwarding Tunnel Request message to the source serving GW to release the temporary resource allocated by the source serving GW used for Indirect Forwarding; and In the step S213, if Indirect Forwarding is used and the serving GW is relocated for the UE, then after the timer started by the target SGSN in the step S206 expires, then the target SGSN sends a Delete Indirect Data Forwarding Tunnel Request message to the target serving GW to release the temporary resource allocated by the target serving GW used for Indirect Forwarding.

(II) IP Flow Mobility

The UE is connected to an EPC through a WLAN access in three different network architectures including an S2a interface based architecture, an S2b interface based architecture and an S2c interface based architecture. S2a interface locates between a trusted WLAN access and GW in EPC, S2b interface locates between an un-trusted WLAN access and GW in EPC, S2c interface locates between UE and GW in EPC. Because the locations of the three interfaces are different, so the procedure to move an IP flow to the WLAN access is different in different architectures. Whether a WLAN access is trusted or not is decided by the operator.

IP Flow Mobility (IFOM) enables IP flow mobility between a 3GPP access and a WLAN access, including a process of seamless offloading to a WLAN, mobility of an IP flow between the 3GPP access and the WLAN access, and interaction of a PCC with an ANDSF. This process has been described in details in the 3GPP TR 23.861.

The UE has established a PDN connection through the 3GPP access, and after the UE finds the WLAN access, the UE can add the WLAN access to the PDN connection. A particular process thereof is as illustrated in FIG. 3 which illustrates a method of adding a WLAN access to a PDN connection including:

In the step S301, the UE searches for, finds and is connected with the WLAN access and configures an IPv4 address and/or an IPv6 address/prefix;

In the step S302, the UE performs functions of discovering a Home Agent (HA), bootstrapping the Dual-Stack Mobile IPv6 (DSMIPv6) and monitoring a DSMIPv6 home link, and reference can be made to the TS 23.402 for details thereof;

In the step S303, the UE transmits a Dual-Stack Mobile IPv6 (DSMIPv6) Binding Update message to the HA over the WLAN. The UE can carry a plurality of routing rules in the message. The DSMIPv6 Binding Update message carries an indicator that it is still connected over the home link (i.e., through the 3GPP access), and a binding identifier mobility option in the message describes relevant binding to the home link and other binding to a forward address from the WLAN access;

In the step S304, if the home agent of the UE functions on the PDN GW and dynamic PCC is deployed, then the PDN GW transmits an IP Connectivity Access Network (IP-CAN) Session Modify Request message to a Policy and Charging Rule Function (PCRF) by carrying an updated routing rule in the request message;

In the step S305, if the home agent of the UE functions on the PDN GW, then the PCRF transmits an acknowledgment message including an updated PCC rule (if the PCC rule is updated) to the PDN GW according to resource established successfully in a Bearer Binding and Event Reporting Function (BBERF);

In the step S306, the HA creates DSMIPv6 binding, is configured with the IP flow routing rule and returns a Binding Acknowledge message to the UE to indicate to the UE that the routing rule requested by the UE has been accepted;

In the step S307, the PCRF acknowledges the configuration of a Quality of Service (QoS) rule relevant to Service Data Flows (SDF's) in the target BBERF in response to the IP-CAN Modify Request, which is a procedure performed in a gateway control session and a QoS rule provision procedure, and reference can be made to the TS 23.203 for details thereof; and In the step S308, if the home agent of the UE functions on the PDN GW, then a resource allocated by the source 3GPP access system for the IP flow moved to the WLAN access is removed in a procedure of releasing a 3GPP resource.

FIG. 4 illustrates an IP flow mobility process in a PDN connection including:

In the step S401, the UE is connected with both the 3GPP access and the WLAN access, and all of current traffic of the UE is forwarded from the UTRAN Iu mode whereas no traffic is passed through the WLAN access;

In the step S402, the UE transmits a binding update message to the HA to configure a new routing rule or to modify an existing routing rule so as to apply an IP flow specific to a WLAN access route;

In the step S403, when the HA is deployed to function in the EPC, the PDN GW transmits an IP-CAN Session Modify Request message including an updated routing policy to the PCRF, and mapping between routing addresses and SDF's is stored in the PCRF;

In the step S404, if the HA is deployed to function in the EPC, then the PCRF transmits an acknowledgment message including an updated Policy and Charging Control (PCC) rule to the PDN GW according to resource established in the WLAN In the step S405, the HA transmits a Binding Acknowledge message to indicate to the UE that the routing rule requested by the UE has been accepted;

In the step S406, if the HA is deployed to function in the EPC, then the PCRF makes sure in response to the IP-CAN Session Modify Request that the target RAT has been configured with the relevant QoS rule and the relevant QoS rule has been removed from the source RAT. With a non-3GPP access, this procedure is performed in a Gateway (GW) control session and a QoS rule provision procedure. Reference can be made to the 3GPP TS 23.203 for the GW control session and the QoS rule provision procedure; and In the step S407, if the HA is deployed to function in the EPC, then a procedure of releasing an Evolved Packet System (EPS) resource is performed to release the resource from the 3GPP source access system. Reference can be made to the 3GPP TS 23.402 for details thereof.

(III) An ANDSF

A user equipment for which multiple access systems are supported can be provided by a network with information about available radio access systems, and this function is performed by the ANDSF in the network. FIG. 5 illustrates the architecture of discovering and selecting an access network in a non-roaming scenario, where the ANDSF is a home ANDSF (H-ANDSF).

The user equipment communicates with the ANDSF via an S14 interface. With the ANDSF, the UE can know some information about an access network. The user equipment communicates with the ANDSF through pulling and pushing, where in the former case, the UE requests the ANDSF for the relevant information on its own initiative, and in the latter case, the ANDSF pushes the relevant information to the user equipment on its own initiative. The ANDSF can provide the UE with an Inter-System Mobility Policy (ISMP), an Inter-System Routing Policy (ISRP), Access Network Discovery Information (ANDI) and other information.

Particularly the ISMP relates to information about a series of operator defined rules and preferences, where the policy defines whether to allow inter-system mobility, the most appropriate type of RAT for an access to an Evolved Packet Core (EPC), different priorities of different access schemes and other information. The ISRP includes some information required for inter-system routing, and a user equipment for which multiple radio access interfaces are supported, e.g., a user equipment for which IP Flow Mobility (IFOM) or Multiple-Access PDN Connectivity (MAPCON) is supported, can decide, under the ISRP policy, over which of available access networks, data is transmitted when a specific routing condition is satisfied; and when some access network is disabled for a specific IP data flow and/or a specific APN. The ANDI includes a list of access networks, available nearby the position where the UE is located, of a requested type of RAT, and relevant parameters thereof, e.g., the type of RAT, the identifiers and carrier frequencies of the radio access networks, etc.

The ISRP policy has been extended by the WORM task force and will be introduced below in details. The ISRP policy includes one or more ISRP rules including IP flow description information, routing conditions (rule valid positions and rule valid periods), routing rules and rule priorities. When the current position of a UE and the current time satisfy the routing condition or conditions of one or more ISRP rules, the UE selects an ISRP rule at the highest one of the priorities of these rules. Then the UE selects one of the access networks under the routing rule in the ISRP rule, accesses the access network and moves IP flows, transmitted by the UE, matching with the IP flow description information of the ISRP rule, to the access network.

A routing rule in an ISRP rule includes an access technology, an RAT identifier, a secondary RAT identifier and the priority of an access network. A format of the routing rule is as illustrated below, where the access technology includes a Global System for Mobile Communication (GSM) Enhanced Data rates for GSM Evolution (EDGE) Radio Access Network (GERAN), a Universal Terrestrial Radio Access Network (UTRAN), an Evolved Universal Terrestrial Radio Access Network (E-UTRAN) and a WLAN. Only if the access technology is a WLAN, then the routing rule will include the RAT identifier, the secondary RAT identifier and other information, where the SSID of the WLAN is stored in the RAT identifier, and the HESSID of the WLAN is stored in the secondary RAT identifier. The priority of the access network represents the priority of the access technology in the routing rule.

In summary, there are the following problems during the 3GPP inter-RAT handover of a UE:

Since there are such a limited resources of the target 3GPP access system that one or more bearers of the UE may be lost or the QoS of thereof may be degraded, there may be a poorly guaranteed QoS of IP flows over these affected bearers, thus discouraging the experience of the user and consequently possibly interrupting the services; and after the UE is handed over from the source 3GPP access to the target 3GPP access, the UE moves the specific IP flow to the WLAN access under the policy (e.g., the ANDSF policy) so that two handovers occurs.

SUMMARY OF THE INVENTION

Embodiments of the invention provide a method and device for distributing IP traffic during 3GPP inter-RAT handover so as to improve the efficiency of IP flow mobility and a guaranteed QoS of a user service.

The method for distributing IP traffic during 3GPP inter-RAT handover includes:

determining, by a User Equipment (UE), IP flows to be moved, upon reception of a handover command for a 3GPP inter-RAT handover transmitted by a source 3GPP access device; and accessing, by the UE, a Wireless Local Area Network (WLAN), and moving the IP flows to the WLAN access, during the 3GPP inter-RAT handover.

The device for distributing IP traffic during 3GPP inter-RAT handover includes:

a determining unit configured to determine IP flows to be moved, upon reception of a handover command for a 3GPP inter-RAT handover transmitted by a source 3GPP access device; and an access unit configured to access a Wireless Local Area Network (WLAN), and moving the IP flows to the WLAN access, during the 3GPP inter-RAT handover.

The embodiments of the invention provide a method and device for distributing IP traffic during 3GPP inter-RAT handover, according to which a UE determines one or more IP flows to be moved, upon reception of a handover command for a 3GPP inter-RAT handover transmitted by a source 3GPP access device, so that the 3GPP inter-RAT handover is performed while the IP flows are being moved to thereby improve the efficiency of the IP flow mobility; and also since the IP flows to be moved are determined before the 3GPP inter-RAT handover is performed, the moved IP flows include IP flows that are transmitted over bearers for which resources are allocated unsuccessfully by a target 3GPP access device and that can be transmitted through an WLAN access, thus avoiding a service from being interrupted due to the loss of the bearer and improving a guaranteed QoS of the user service.

DETAILED DESCRIPTION OF THE EMBODIMENTS

Embodiments of the invention provide a method and device for distributing IP traffic during 3GPP inter-RAT handover, and a UE determines IP flows to be moved upon reception of a handover command for a 3GPP inter-RAT handover transmitted by a source 3GPP access device, so that the 3GPP inter-RAT handover is performed while the IP flows are being moved to thereby improve the efficiency of the IP flow mobility; and also since the IP flows to be moved are determined before the 3GPP inter-RAT handover is performed, the moved IP flows include IP flows that are transmitted over bearers for which resources are allocated unsuccessfully by a target 3GPP access device and that can be transmitted through an WLAN access, thus avoiding a service from being interrupted due to the loss of the bearer and improving a guaranteed QoS of the user service.

Particularly in an EPS system, a UE transmits IP flows over a PDN connection, and if the UE decides to move all of IP flows transmitted over some PDN connection to a WLAN access, then the UE switches the PDN connection to the WLAN access. In other words, the UE moves all of IP flows transmitted over some PDN connection to the WLAN access, which is equivalent to switching of the PDN connection to the WLAN access.

Figure 5A:
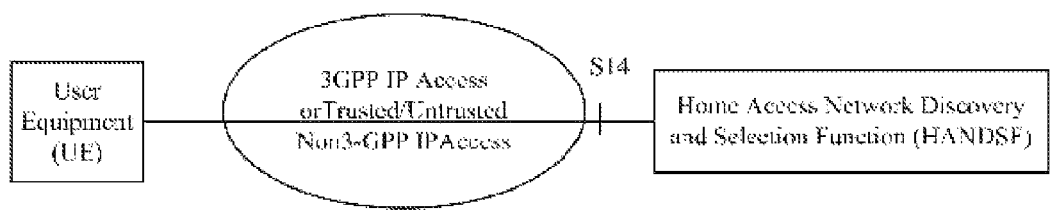
FIG. 5a is a schematic structural diagram of the ANDSF in the prior art.
Figure 5B:
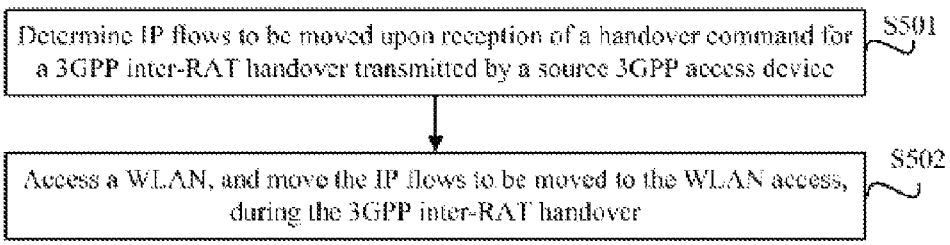
FIG. 5b is a flow chart of a method for distributing IP traffic during 3GPP inter-RAT handover according to an embodiment of the invention.

As illustrated in FIG. 5b, a method for distributing IP traffic during 3GPP inter-RAT handover according to an embodiment of the invention includes:

In the step S501, a UE determines IP flows to be moved upon reception of a handover command for a 3GPP inter-RAT handover transmitted by a source 3GPP access device; and In the step S502, the UE accesses a WLAN, and moves the IP flows to be moved to the WLAN access, during the 3GPP inter-RAT handover.

During 3GPP inter-RAT handover, the UE moves the IP flows satisfying a specific condition to the WLAN access upon reception of the handover command for the 3GPP inter-RAT handover from the source 3GPP access device, and since the IP flows are determined and moved by the UE earlier after the 3GPP inter-RAT handover is prepared instead of being determined and moved at the end of the 3GPP inter-RAT handover, thus lowering a delay in switching the IP flows and providing a user with a better experience of a service.

Since the IP flows are moved by involving different network elements from network elements involved in the 3GPP inter-RAT handover, the UE can move the IP flows during the 3GPP inter-RAT handover without any influence upon a delay of the 3GPP inter-RAT handover.

Particularly upon reception of the handover command for the 3GPP inter-RAT handover from the source 3GPP access device, the UE judges from information available thereto, e.g., an ANDSF policy, a target 3GPP access network, the WLAN access which can be found by the UE, etc., whether to move some IP flows to the WLAN access, and if a result of the judgment by the UE is to move some IP flows to the WLAN access, then the UE proceeds with the 3GPP inter-RAT handover while accessing the WLAN and moving the IP flows to the WLAN access; and if the result of the judgment by the UE is not to move the IP flows to the WLAN access, then the UE just needs to proceed with the 3GPP inter-RAT handover.

Thus when the result of the judgment by the UE is to move some IP flows to the WLAN access, the UE needs to perform the following two procedures concurrently, one of which is a procedure of accessing the WLAN and moving the IP flows decided by the UE to the WLAN access, and the other of which is a procedure of the 3GPP inter-RAT handover, i.e., handover operations to be performed by the UE upon reception of the handover command for the 3GPP inter-RAT handover from the source 3GPP access device.

Figure 6:
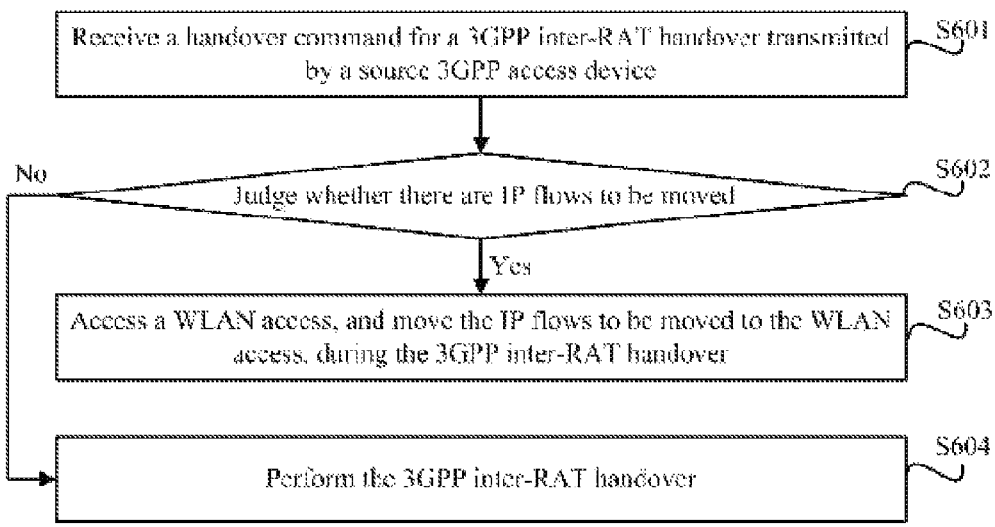
FIG. 6 is a flow chart of a particular method for distributing IP traffic during 3GPP inter-RAT handover according to an embodiment of the invention.

As illustrated in FIG. 6, a particular method for distributing IP traffic during 3GPP inter-RAT handover includes:

The step S601 is to receive a handover command for a 3GPP inter-RAT handover transmitted by a source 3GPP access device;

The step S602 is to judge whether there are IP flows to be moved, and if so, to proceed to the step S603; otherwise, to proceed to the step S604;

The step S603 is to access a WLAN, and to move the IP flows to be moved to the WLAN access, during the 3GPP inter-RAT handover; and The step S604 is to perform the 3GPP inter-RAT handover.

In the step S603, the UE accesses the WLAN and moves the IP flows, to be moved to the WLAN access, to the WLAN access in different operations of the UE dependent upon whether the UE can access successfully the WLAN: if the UE accesses successfully the WLAN, then the UE moves the IP flows, to be moved to the WLAN access, to the WLAN access in a mechanism of IP flow mobility; and if the UE accesses the WLAN unsuccessfully, then the flow ends and the UE will not move any IP flow.

Figure 1:
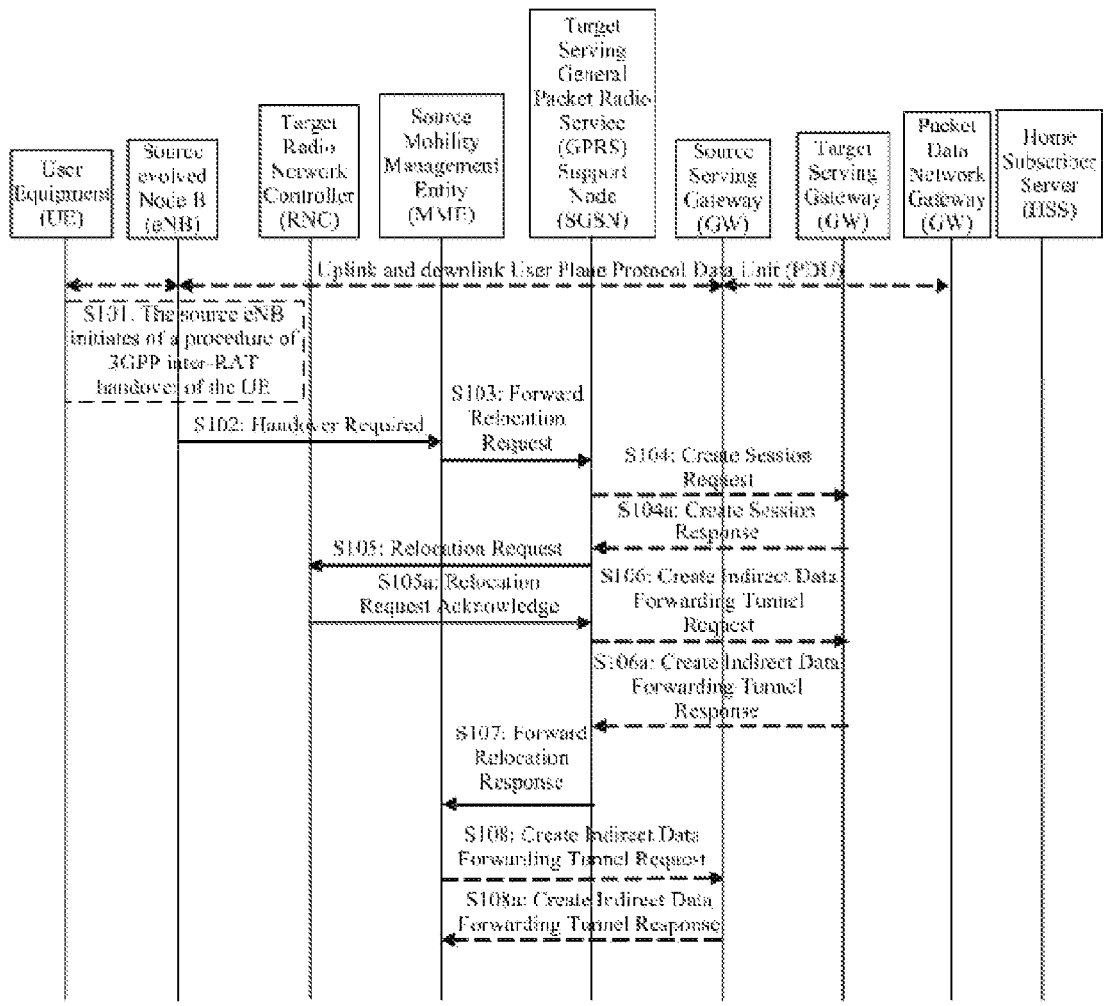
FIG. 1 is a flow chart of the preparation phase of a 3GPP inter-RAT handover in the prior art.
Figure 2:
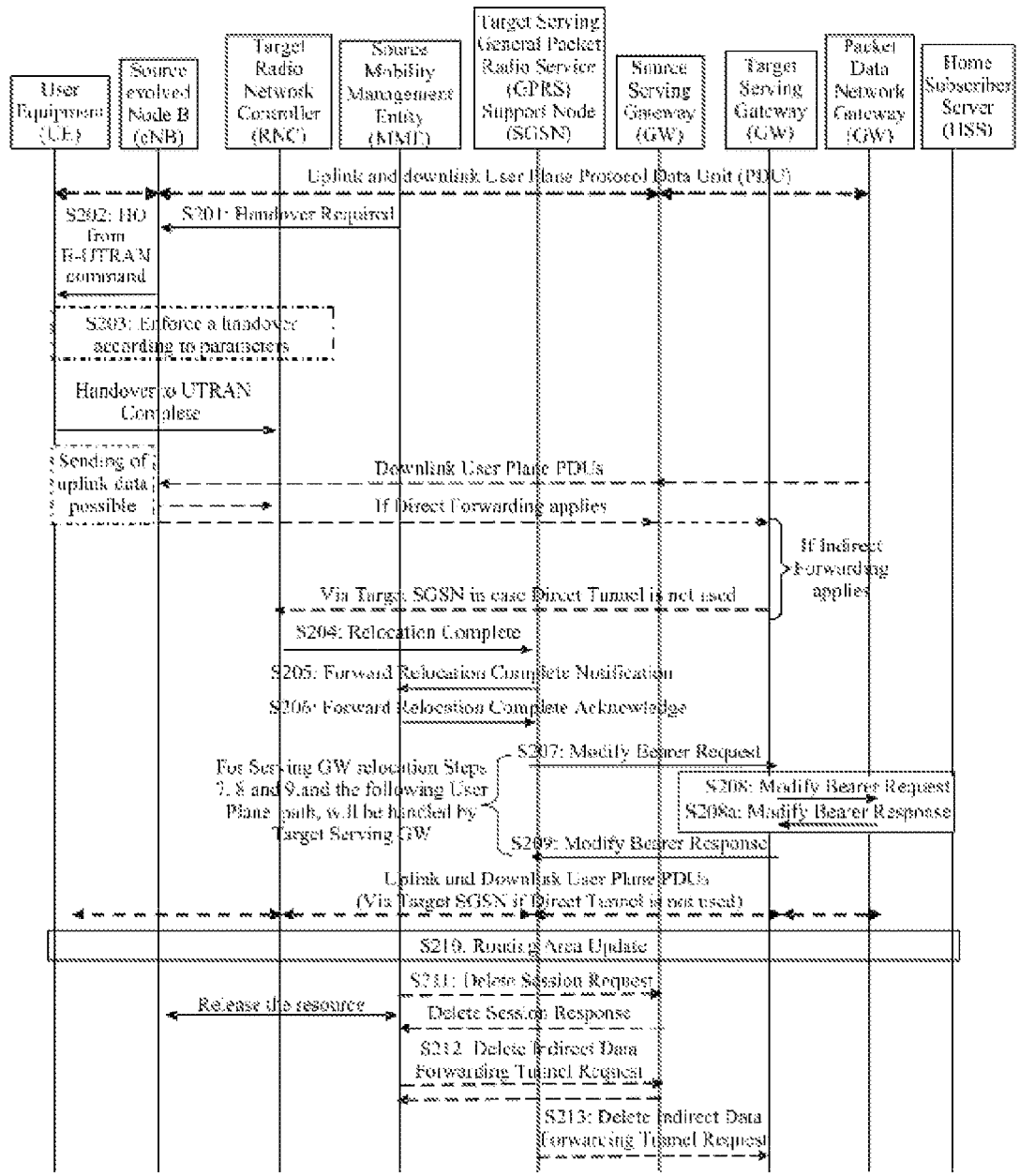
FIG. 2 is a flow chart of the enforcement phase of a 3GPP inter-RAT handover in the prior art.
Figure 3:
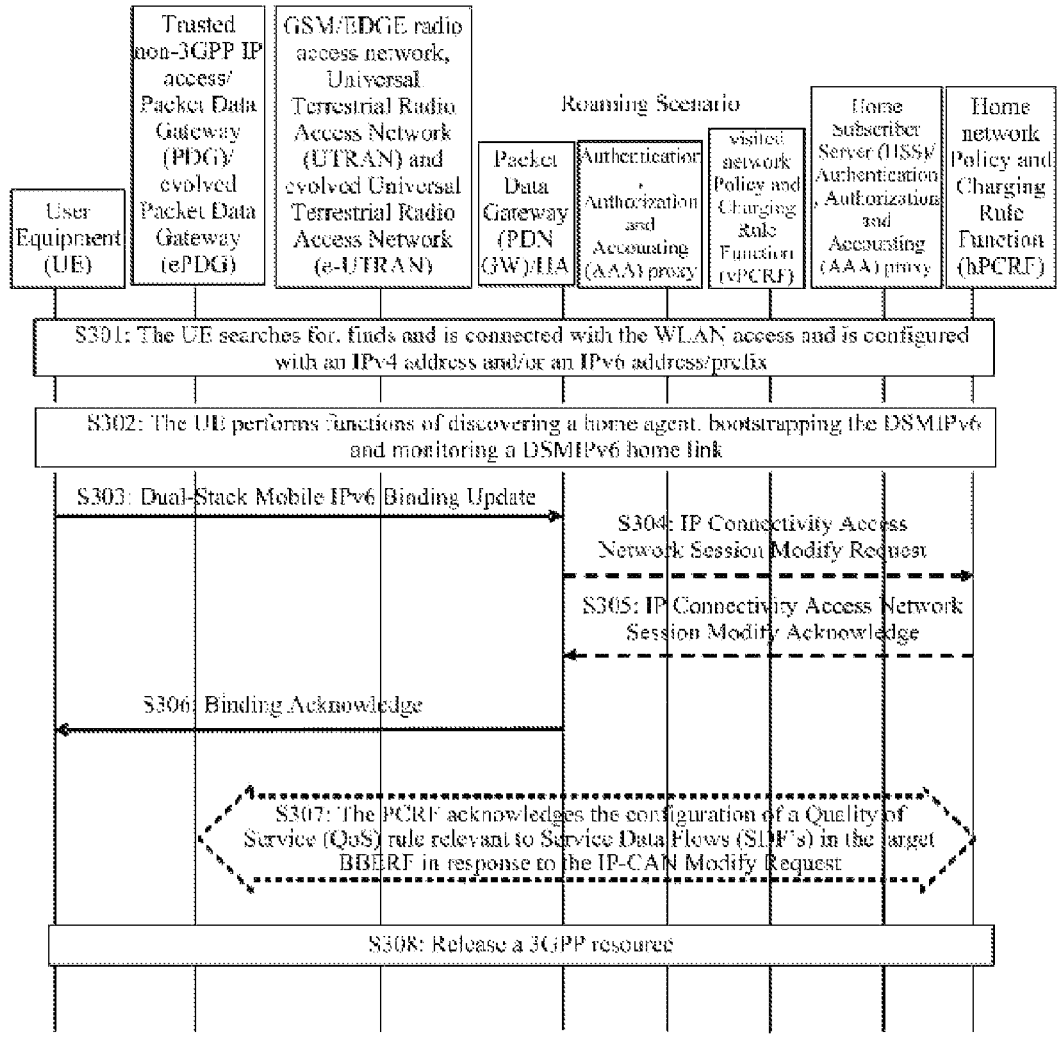
FIG. 3 is a flow chart of the UE adding the WLAN access to the PDN connection in the prior art.
Figure 4:
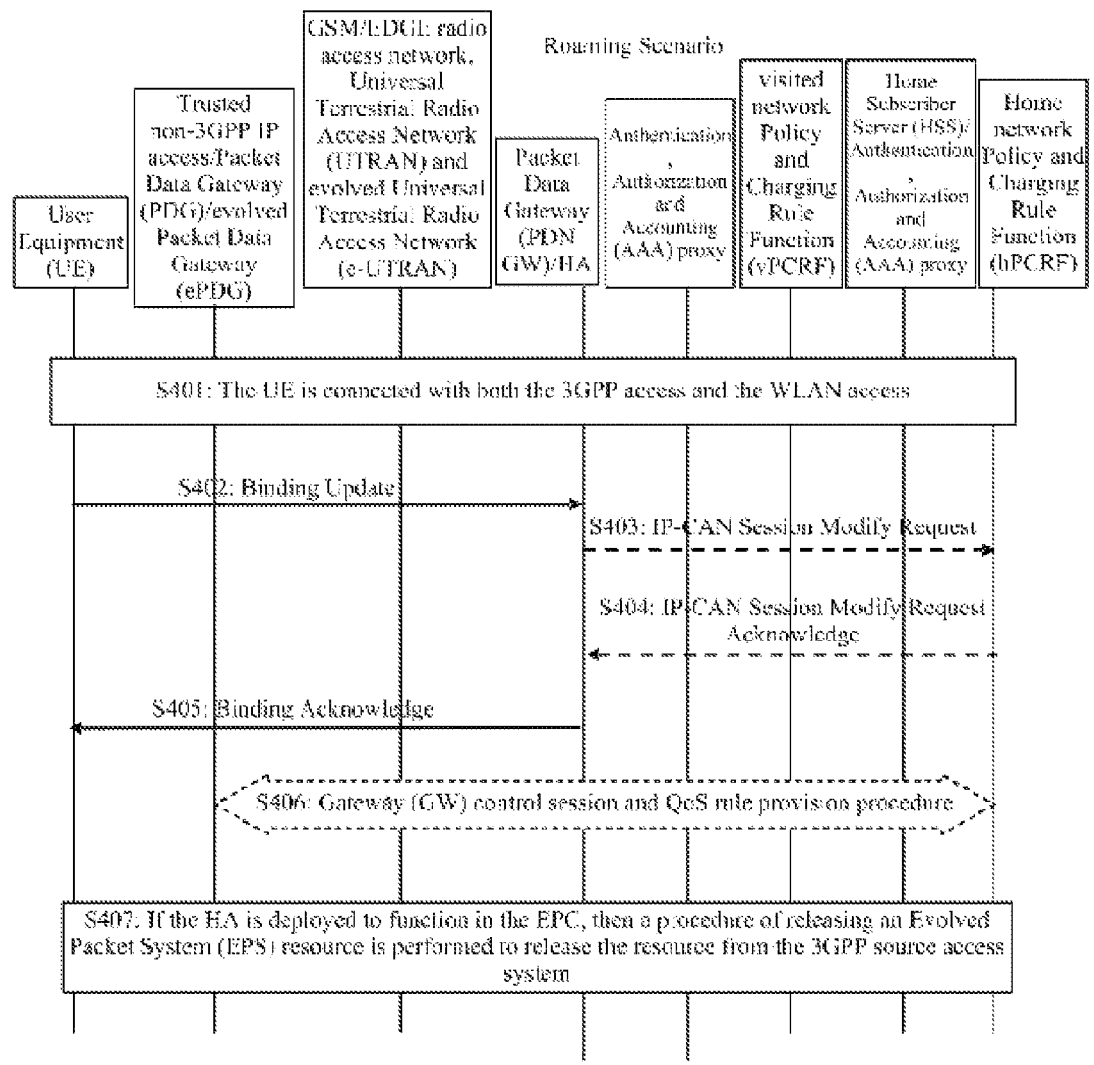
FIG. 4 is a flow chart of the UE moving the IP flow in the PDN connection to the WLAN in the prior art.
Figure 7:
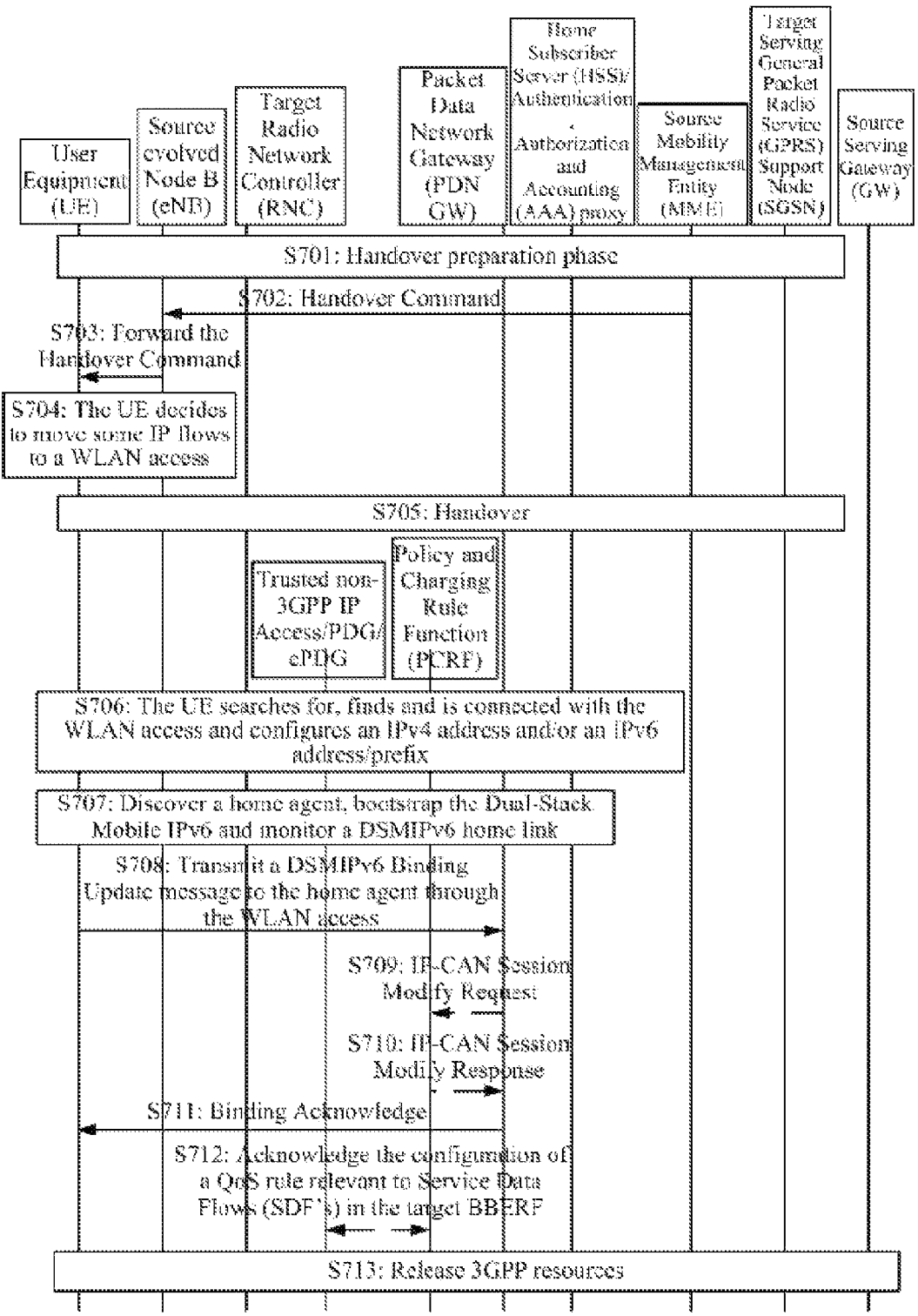
FIG. 7 is a flow chart of a method for 3GPP inter-RAT handover and IP traffic distribution according to an embodiment of the invention.

Particularly by way of an example where the UE is handed over from an E-UTRAN to a UTRAN Iu mode, the UE receives an HO from E-UTRAN Command message and decides to move some IP flows to the WLAN access, and then the UE accesses the WLAN, and thereafter the UE moves the IP flows to the WLAN access in an IFOM mechanism. A particular process thereof as illustrated in FIG. 7 includes:

In the step S701, a UE is handed over from an E-UTRAN to a UTRAN Iu mode in a handover preparation phase, and reference can be made to FIG. 1 for details thereof;

In the step S702, a source MME transmits a Handover Command message to a source eNodeB at the end of the handover preparation;

In the step S703, the source eNodeB forwards the Handover Command message to the UE, i.e., an HO from E-UTRAN Command;

In the step S704, the UE decides to move some IP flows to a WLAN access;

In the step S705, the UE performs the 3GPP inter-RAT handover, and reference can be made to FIG. 2 for details thereof;

The following steps are performed concurrently with the step S705:

In the step S706, the UE searches for, finds and is connected with the WLAN access and configures an IPv4 address and/or an IPv6 address/prefix;

In the step S707, the UE performs functions of discovering a Home Agent (HA), bootstrapping the Dual-Stack Mobile IPv6 and monitoring a DSMIPv6 home link, and reference can be made to the TS 23.402 for details thereof;

In the step S708, the UE transmits a DSMIPv6 Binding Update message including parameters of HoA, CoA, Lifetime, BID, FID and Flow Description to the HA through the WLAN access, where the HoA (i.e., Home Address) is an IP address configured by the UE from an IP address prefix allocated by a PDN GW for the UE, the CoA (i.e., Care-of Address) is an IP address available to the UE from the WLAN access, the Lifetime is a period of lifetime preset by the UE for the binding, the BID (i.e., Binding Identifier) is a binding identifier, the FID (i.e., Flow Identifier) is a flow identifier, and the Flow Description includes information about the IP flows, where a flow description is associated with an FID, and an associated pair of an FID and a flow description represent a flow binding message in which n represents the number of IP flows to be transferred by the UE to the WLAN access;

In the step S709, if the home agent of the UE functions on the PDN GW and dynamic PCC is deployed, then the PDN GW transmits an IP-CAN Session Modify Request message to a PCRF by carrying an updated routing rule in the request message. The PCRF stores mapping between each Service Data Flow (SDF) and a corresponding routing address;

In the step S710, if the home agent of the UE functions on the PDN GW, then the PCRF transmits an acknowledgment message including an updated PCC rule (if the PCC rule is updated) to the PDN GW over a resource established successfully in a BBERF;

In the step S711, the HA creates DSMIPv6 binding, is configured with the IP flow routing rule and returns a Binding Acknowledge message to the UE to indicate to the UE that the routing rule requested by the UE has been accepted;

In the step S712, the PCRF acknowledges the configuration of a QoS rule relevant to Service Data Flows (SDF's) in the target BBERF in response to the IP-CAN Modify Request, which is a procedure performed in a gateway control session and a QoS rule provision procedure, and reference can be made to the TS 23.203 for details thereof; and In the step S713, if the home agent of the UE functions on the PDN GW, then resources allocated by the source 3GPP access system for the IP flows moved to the WLAN access are removed in a procedure of releasing a 3GPP resource.

With the flow above, the 3GPP inter-RAT handover is performed while distributing the IP flows to thereby improve the efficiency of the IP flow mobility.

In the step S602, it can be judged in different judgment sequences whether there are IP flows to be moved, and those skilled in the art can make the judgment in a manner as needed in reality or can make the judgment against another criterion in another manner as needed in reality.

A process of judging whether there are IP flows to be moved will be described below in details with reference to particular embodiments thereof:

First Embodiment

IP flows to be moved are determined upon reception of a handover command for a 3GPP inter-RAT handover transmitted by a source 3GPP access device as follows:

Bearers for which resources are allocated unsuccessfully by a target 3GPP access device and bearers for which resources are allocated successfully by the target 3GPP access device are determined from parameters in a handover command for a 3GPP inter-RAT handover transmitted by a source 3GPP access device upon reception of the handover command for the 3GPP inter-RAT handover; and IP flows to be moved are determined from the bearers for which resources are allocated unsuccessfully by the target 3GPP access device and the bearers for which resources are allocated successfully by the target 3GPP access device.

Particularly IP flows to be moved are determined from the bearers for which resources are allocated unsuccessfully by the target 3GPP access device and the bearers for which resources are allocated successfully by the target 3GPP access device as follows:

IP flows which can be moved to a WLAN access among IP flows transmitted over the bearers for which resources are allocated unsuccessfully by the target 3GPP access device are determined as the IP flows to be moved; and/or IP flows which can be moved to the WLAN access and for which the WLAN access has higher priorities than a target 3GPP access among IP flows transmitted over the bearers for which resources are allocated successfully by the target 3GPP access device are determined as the IP flows to be moved.

In this embodiment, the UE can know information about the bearers for which resources are allocated unsuccessfully by the target 3GPP access device (i.e., bearers which are not accepted by the target 3GPP access device) and the bearers for which resources are allocated successfully by the target 3GPP access device (i.e., bearers which are accepted by the target 3GPP access device) from the parameters in the handover command representing the 3GPP inter-RAT handover upon reception of the handover command from the source 3GPP access device. The UE judges from the different bearers which IP flows need to be moved to the WLAN access.

For the bearers for which resources are allocated unsuccessfully by the target 3GPP access device, it is judged directly whether there are IP flows which can be moved to the WLAN access among the IP flows transmitted over the bearers for which resources are allocated unsuccessfully by the target 3GPP access device, and if so, then the IP flows which can be moved to the WLAN access are determined as the IP flows to be moved; and For the bearers for which resources are allocated successfully by the target 3GPP access device, it is judged whether there are IP flows which can be moved to the WLAN access among the IP flows transmitted over the bearers for which resources are allocated successfully by the target 3GPP access device, and if so, then it is further judged whether there are IP flows for which the WLAN access has higher priorities than the target 3GPP access among these IP flows which can be moved to the WLAN access, and if so, then the IP flows for which the WLAN access has higher priorities than the target 3GPP access are determined as the IP flows to be moved.

For example, the UE is located in a 3GPP E-UTRAN, and IP flows of the UE and bearers over which the IP flows are transmitted are IP flow 1-bearer 1, IP flow 2-bearer 1, IP flow 3-bearer 2 and IP flow 4-bearer 3.

It is assumed that at this time an ANDSF policy applicable to the UE includes at least one of the following rules:

Under an ISRP rule 1, the WLAN access has priority 1 and the UTRAN Iu mode has priority 2 for IP flow description information 1;

Under an ISRP rule 2, the UTRAN Iu mode has priority 1 and the WLAN access has priority 2 for IP flow description information 2; and Under an ISRP rule 3, the E-UTRAN has priority 1 of and the UTRAN Iu mode has priority 2 for IP flow description information 3.

The IP flow 1 and the IP flow 3 currently transmitted by the UE can match with the IP flow description information 1 in the ISRP rule 1, the IP flow 4 can match with the IP flow description information in the ISRP rule 2, and the IP flow 2 can match with the IP flow description information in the ISRP rule 3.

As can be apparent from the ANDSF policy in the UE, IP flows which can be transmitted through the WLAN access are the IP flow 1, the IP flow 3 and the IP flow 4; IP flows for which the WLAN access has higher priorities than the UTRAN Iu mode are the IP flow 1 and the IP flow 3; and an IP flow for which the WLAN access has a higher priority than the UTRAN Iu mode is the IP flow 4; and The UE needs to be handed over from the E-UTRAN to the UTRAN Iu mode upon reception of a Handover from E-UTRAN Command, and the UE knows from parameters in the Handover from E-UTRAN Command that a bearers for which a resource is allocated unsuccessfully at the target side is the bearer 1 and bearers for which resources are allocated successfully are the bearer 2 and the bearer 3.

Since the bearer 1 is not accepted by the target access network, the UE moves the IP flows transmitted over the bearer 1 to the WLAN access, but the UE can know from the ANDSF policy that the IP flow 2 transmitted over the bearer 1 can not be transmitted through the WLAN access, so the UE moves the IP flow transmitted over the bearer 1 to the WLAN access.

Since both the bearers 2 and 3 are accepted by the target access network, and for the IP flow 3 transmitted over the bearer 2, WLAN access has a higher priority than the UTRAN Iu mode, the UE moves the IP flow 3 to the WLAN access.

Thus the UE finally moves the IP flow 1 and the IP flow 3 to the WLAN access.

Second Embodiment

IP flows to be moved are determined upon reception of a handover command for a 3GPP inter-RAT handover transmitted by a source 3GPP access device as follows:

3GPP access information, WLAN access information and IP flow information is determined upon reception of a handover command for a 3GPP inter-RAT handover transmitted by a source 3GPP access device; and IP flows to be moved are determined from the 3GPP access information, the WLAN access information and the IP flow information.

The 3GPP access information can particularly include source 3GPP access information and target 3GPP access information.

Particularly IP flows to be moved are determined from the 3GPP access information, the WLAN access information and the IP flow information as follows:

IP flows for which the WLAN access has higher priorities than the target 3GPP access are determined from the 3GPP access information, the WLAN access information and the IP flow information as the IP flows to be moved; and/or IP flows for which the WLAN access has lower priorities than the target 3GPP access and matched for transmission over bearers for which resources are allocated unsuccessfully by a target 3GPP access device are determined from the 3GPP access information, the WLAN access information, the IP flow information and an ANDSF policy as the IP flows to be moved.

In this embodiment, the UE categories current IP flows thereof into the following two classes according to the relevant information, e.g., the target 3GPP access, the WLAN access, the handover command for the 3GPP inter-RAT handover, the information about the IP flows, the ANDSF policy, etc., upon reception of the handover command from the source 3GPP access device:

1. IP flows which can be moved to the WLAN access; and
2. IP flows which can not be moved to the WLAN access.

Particularly the IP flows which can be moved to the WLAN access can be further categorized in the following two classes:

1) IP flows for which the WLAN access has higher priorities than the target 3GPP access; and
2) IP flows the WLAN access has lower priorities than the target 3GPP access.

The UE judges from the categorization information above whether to move some IP flows to the WLAN access;

For the IP flows which can not be moved to the WLAN access, the UE can move these IP flows to the target 3GPP access in subsequent 3GPP inter-RAT handover after the judgment; and For the IP flows which can be moved to the WLAN access, if they are IP flows for which the WLAN access has higher priorities than the target 3GPP access, then the IP flows are determined as the IP flows to be moved; and if they are IP flows for which the WLAN access has lower priorities than the target 3GPP access, then it is further judged whether the IP flows for which the WLAN access has lower priorities than the target 3GPP access are matched to the bearers for which resources are allocated unsuccessfully by the target 3GPP access device, and if so, then the IP flows matched to the bearers for which resources are allocated unsuccessfully by the target 3GPP access device are determined as the IP flows to be moved.

For example, the UE is located in a 3GPP E-UTRAN, and IP flows of the UE and bearers over which the IP flows are transmitted are IP flow 1-bearer 1, IP flow 2-bearer 1, IP flow 3-bearer 2 and IP flow 4-bearer 3; and As can be apparent from the ANDSF policy in the UE, IP flows which can be transmitted through the WLAN access are the IP flow 1, the IP flow 3 and the IP flow 4; IP flows for which the WLAN access has higher priorities than the UTRAN Iu mode are the IP flow 1 and the IP flow 3; and an IP flow for which WLAN access has a lower priority than the UTRAN Iu mode is the IP flow 4.

It is assumed that at this time the ANDSF policy applicable to the UE includes at least one of the following rules:

Under an ISRP rule 1, the WLAN access has priority 1 and the UTRAN Iu mode has priority 2 for IP flow description information 1;

Under an ISRP rule 2, the UTRAN Iu mode has priority 1 and the WLAN access has priority 2 for IP flow description information 2; and Under an ISRP rule 3, the E-UTRAN has priority 1 and the UTRAN Iu mode has priority 2 for IP flow description information 3.

The IP flow 1 and the IP flow 3 currently transmitted by the UE can match with the IP flow description information 1 in the ISRP rule 1, the IP flow 4 can match with the IP flow description information in the ISRP rule 2, and the IP flow 2 can match with the IP flow description information in the ISRP rule 3.

The UE searches for a WLAN access available around upon reception of a Handover from E-UTRAN Command, and then the UE derives the following information from the target 3GPP access (the UTRAN Iu mode), the available WLAN access, an instruction for a handover from the E-UTRAN to the UTRAN Iu mode, the information about the current IP flows of the UE, the ANDSF policy and other information:

IP flows which can be moved to the WLAN access are determined, where IP flows for which the WLAN access has higher priorities than the target 3GPP access are the IP flow 1 and the IP flow 3; an IP flow for which WLAN access has a lower priority than the target 3GPP access is the IP flow 4; and an IP flow which can not be moved to the WLAN access is determined as the IP flow 2; and The UE can determine from the information above there are IP flows for which the WLAN access has higher priorities than the target 3GPP access, i.e., the IP flow 1 and the IP flow 3, and then the UE decides to move the IP flow 1 and the IP flow 3 to the WLAN access.

For the IP flow 4, WLAN access has a lower priority than the target 3GPP access, and then the UE can know parameters from the Handover from E-UTRAN Command that a resource is allocated at the target side unsuccessfully for the bearer 1 and the UE matches the IP flow 4 unsuccessfully with the bearer 1, so the UE decides not to move the IP flow 4 to the WLAN access.

Thus the UE finally moves the IP flow 1 and the IP flow 3 to the WLAN access.

In order to categorize the current IP flows of the UE into different classes, a connection management entity in the UE can be functionally extended.

If the UE can find an available WLAN access upon reception of the handover command representing the 3GPP inter-RAT handover from the source 3GPP access device, then the UE provides the connection management entity internal to the UE with the information available thereto, e.g., the WLAN access found by the UE, the target 3GPP access, the handover instruction and other information, to trigger the connection management entity to categorize the IP flows of the UE into different classes; and if the UE does not find any available WLAN access, then the UE will not trigger the connection management entity to perform any operation, that is, the UE only performs the 3GPP inter-RAT handover.

Figure 8:
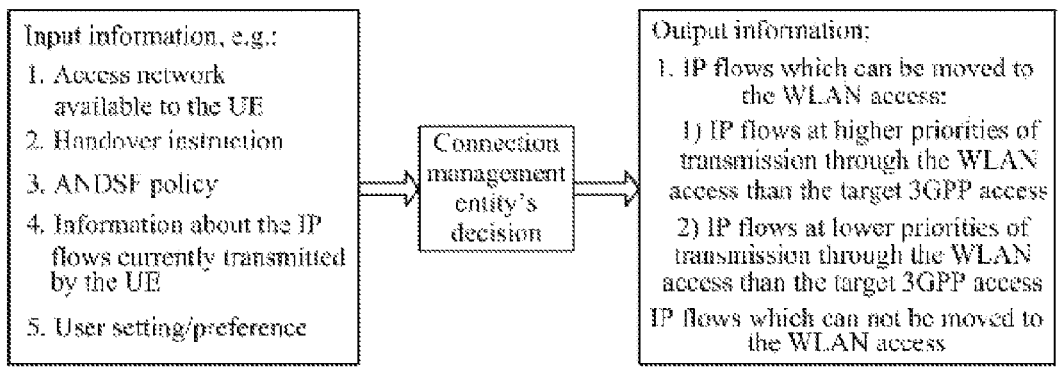
FIG. 8 is a schematic diagram of a decision by a connection management entity according to an embodiment of the invention.

As illustrated in FIG. 8, the connection management entity judges from the information provided by the UE and information available thereto, e.g., the ANDSF policy, the IP flow information of the UE, a user setting or preference, etc., which IP flows can be moved to the WLAN access and which IP flows for which the WLAN access has higher priorities than the target 3GPP access among the IP flows can be moved to the WLAN access.

The connection management entity makes judgment from the information available thereto and then categorizes the IP flows currently transmitted by the UE into the following several classes:

There are two classes of IP flows which can be moved to the WLAN access and IP flows which can not be moved to the WLAN access, and the IP flows which can be moved to the WLAN access can be further categorized into IP flows for which the WLAN access has higher priorities than the target 3GPP access and IP flows for which the WLAN access has lower priorities than the target 3GPP access.

Figure 9:
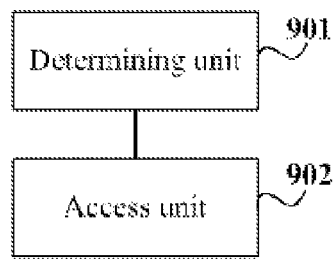
FIG. 9 is a schematic structural diagram of a device for distributing IP traffic during 3GPP inter-RAT handover according to an embodiment of the invention.

An embodiment of the invention further provides correspondingly a device for distributing IP traffic during 3GPP inter-RAT handover, and the device is particularly a user equipment as illustrated in FIG. 9 including:

A determining unit 901 is configured to determine IP flows to be moved upon reception of a handover command for a 3GPP inter-RAT handover transmitted by a source 3GPP access device; and An access unit 902 is configured to access a WLAN, and to move the IP flows to be moved to the WLAN access, during the 3GPP inter-RAT handover.

Particularly the determining unit 901 can include the connection management entity in the embodiment of the invention.

In correspondence to the first embodiment, the determining unit 901 is configured:

To determine bearers for which resources are allocated unsuccessfully by a target 3GPP access device and bearers for which resources are allocated successfully by the target 3GPP access device from parameters in the handover command for the 3GPP inter-RAT handover transmitted by the source 3GPP access device upon reception of the handover command for the 3GPP inter-RAT handover; and To determine the IP flows to be moved from the bearers for which resources are allocated unsuccessfully by the target 3GPP access device and the bearers for which resources are allocated successfully by the target 3GPP access device.

Particularly the determining unit 901 configured to determine the IP flows to be moved from the bearers for which resources are allocated unsuccessfully by the target 3GPP access device and the bearers for which resources are allocated successfully by the target 3GPP access device is configured:

To determine IP flows which can be moved to the WLAN access among the IP flows transmitted over the bearers for which resources are allocated unsuccessfully by the target 3GPP access device as the IP flows to be moved; and/or To determine IP flows which can be moved to the WLAN access and for which the WLAN access has higher priorities the WLAN access than a target 3GPP access among IP flows transmitted over the bearers for which resources are allocated successfully by the target 3GPP access device as the IP flows to be moved.

In correspondence to the second embodiment, the determining unit 901 is configured:

To determine 3GPP access information, WLAN access information, IP flow information and an ANDSF policy from parameters in the handover command for the 3GPP inter-RAT handover transmitted by the source 3GPP access device upon reception of the handover command for the 3GPP inter-RAT handover; and To determine the IP flows to be moved from the 3GPP access information, the WLAN access information, the IP flow information and the ANDSF policy.

Particularly the determining unit configured to determine the IP flows to be moved from the 3GPP access information, the WLAN access information, the IP flow information and the ANDSF policy is configured:

To determine IP flows for which the WLAN access has higher priorities than a target 3GPP access from the 3GPP access information, the WLAN access information, the IP flow information and the ANDSF policy as the IP flows to be moved; and/or To determine IP flows the WLAN access has lower priorities than the target 3GPP access and matched for transmission over bearers for which resources are allocated unsuccessfully by a target 3GPP access device from the 3GPP access information, the WLAN access information, the IP flow information and the ANDSF policy as the IP flows to be moved.

Figure 10:
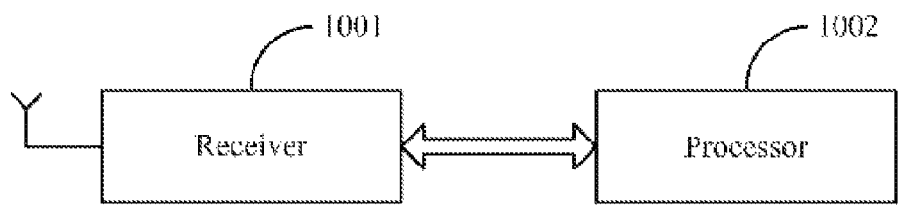
FIG. 10 is a schematic structural diagram of a UE according to an embodiment of the invention.

As illustrated in FIG. 10, another UE according to an embodiment of the invention includes:

A receiver 1001 is configured to determine IP flows to be moved upon reception of a handover command for a 3GPP inter-RAT handover transmitted by a source 3GPP access device; and A processor 1002 is configured to access a WLAN, and to move the IP flows to be moved to the WLAN access, during the 3GPP inter-RAT handover.

Particularly the receiver 1001 can include the connection management entity in the embodiment of the invention.

In correspondence to the first embodiment, the receiver 1001 is configured:

To determine bearers for which resources are allocated unsuccessfully by a target 3GPP access device and bearers for which resources are allocated successfully by the target 3GPP access device from parameters in the handover command for the 3GPP inter-RAT handover transmitted by the source 3GPP access device upon reception of the handover command for the 3GPP inter-RAT handover; and To determine the IP flows to be moved from the bearers for which resources are allocated unsuccessfully by the target 3GPP access device and the bearers for which resources are allocated successfully by the target 3GPP access device.

Particularly the receiver 1001 configured to determine the IP flows to be moved from the bearers for which resources are allocated unsuccessfully by the target 3GPP access device and the bearers for which resources are allocated successfully by the target 3GPP access device is configured:

To determine IP flows which can be moved to the WLAN access among the IP flows transmitted over the bearers for which resources are allocated unsuccessfully by the target 3GPP access device as the IP flows to be moved; and/or To determine IP flows which can be moved to the WLAN access and for which the WLAN access has higher priorities than a target 3GPP access among IP flows transmitted over the bearers for which resources are allocated successfully by the target 3GPP access device as the IP flows to be moved.

In correspondence to the second embodiment, the receiver 1001 is configured:

To determine 3GPP access information, WLAN access information, IP flow information and an ANDSF policy from parameters in the handover command for the 3GPP inter-RAT handover transmitted by the source 3GPP access device upon reception of the handover command for the 3GPP inter-RAT handover; and To determine the IP flows to be moved from the 3GPP access information, the WLAN access information, the IP flow information and the ANDSF policy.

Particularly the determining unit configured to determine the IP flows to be moved from the 3GPP access information, the WLAN access information, the IP flow information and the ANDSF policy is configured:

To determine IP flows for which the WLAN access has higher priorities than a target 3GPP access from the 3GPP access information, the WLAN access information, the IP flow information and the ANDSF policy as the IP flows to be moved; and/or To determine IP flows for which the WLAN access has lower priorities than the target 3GPP access and matched for transmission over bearers for which resources are allocated unsuccessfully by a target 3GPP access device from the 3GPP access information, the WLAN access information, the IP flow information and the ANDSF policy as the IP flows to be moved.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for distributing Internet Protocol (IP) traffic during $3^{rd}$ Generation Partner Project (3GPP) inter-Radio Access Technology (RAT) handover, the method comprising:
   determining, by a User Equipment (UE), IP flows to be moved, upon reception of a handover command for an inter-RAT 3GPP handover from a source 3GPP access device to a target 3GPP access device, transmitted by the source 3GPP access device;
   accessing, by the UE, a Wireless Local Area Network (WLAN), during the inter-RAT 3GPP handover; and
   moving the IP flows to be moved, to the accessed WLAN, during the inter-RAT 3GPP handover.

2. The method according to claim 1, wherein determining, by the UE, the IP flows to be moved, upon reception of the handover command for the inter-RAT 3GPP handover from the source 3GPP access device to the target 3GPP access device, transmitted by the source 3GPP access device comprises:
   determining, by the UE, bearers for which resources are allocated unsuccessfully by the target 3GPP access device and bearers for which resources are allocated successfully by the target 3GPP access device, from parameters in the handover command for the inter-RAT 3GPP handover transmitted by the source 3GPP access device, upon reception of the handover command for the inter-RAT 3GPP handover; and
   determining, by the UE, the IP flows to be moved, from the bearers for which resources are allocated unsuccessfully by the target 3GPP access device and the bearers for which resources are allocated successfully by the target 3GPP access device.

3. The method according to claim 2, wherein determining, by the UE, the IP flows to be moved, from the bearers for which resources are allocated unsuccessfully by the target 3GPP access device and the bearers for which resources are allocated successfully by the target 3GPP access device comprises:
   determining, by the UE, IP flows which can be moved to the accessed WLAN among the IP flows transmitted over the bearers for which resources are allocated unsuccessfully by the target 3GPP access device, as the IP flows to be moved; and/or
   determining, by the UE, IP flows which can be moved to the accessed WLAN and for which the WLAN access has higher priorities than a target 3GPP access among IP flows transmitted over the bearers for which resources are allocated successfully by the target 3GPP access device, as the IP flows to be moved.

4. The method according to claim 1, wherein determining, by the UE, the IP flows to be moved, upon reception of the handover command for the inter-RAT 3GPP handover transmitted by the source 3GPP access device comprises:
   determining, by the UE, 3GPP access information, WLAN access information, IP flow information and an Access Network Discovery and Selection Function (ANDSF) policy, upon reception of the handover command for the inter-RAT 3GPP handover transmitted by the source 3GPP access device; and
   determining, by the UE, the IP flows to be moved, from the 3GPP access information, the WLAN access information, the IP flow information and the ANDSF policy.

5. The method according to claim 4, wherein determining, by the UE, the IP flows to be moved, from the 3GPP access information, the WLAN access information, the IP flow information and the ANDSF policy comprises:
   determining, by the UE, IP flows for which the WLAN access has higher priorities than a target 3GPP access, from the 3GPP access information, the WLAN access information, the IP flow information and the ANDSF policy, as the IP flows to be moved; and/or
   determining, by the UE, IP flows for which the WLAN access has lower priorities than the target 3GPP access and matched for transmission over bearers for which resources are allocated unsuccessfully by a target 3GPP access device, from the 3GPP access information, the WLAN access information, the IP flow information and the ANDSF policy, as the IP flows to be moved.

6. A device for distributing Internet Protocol (IP) traffic during $3^{rd}$ Generation Partner Project (3GPP) inter-Radio Access Technology (RAT) handover, the device comprising:
   a processor and a memory, wherein the memory stores one or more computer readable program codes, and the processor is configured to execute the computer readable program codes:
   to determine IP flows to be moved, upon reception of a handover command for an inter-RAT 3GPP handover from a source 3GPP access device to a target 3GPP access device, transmitted by the source 3GPP access device;
   to access a Wireless Local Area Network (WLAN) during the inter-RAT 3GPP handover; and
   to move the IP flows to be moved, to the accessed WLAN, during the inter-RAT 3GPP handover.

7. The device according to claim 6, wherein the processor is further configured to execute the computer readable program codes:
   to determine bearers for which resources are allocated unsuccessfully by the target 3GPP access device and bearers for which resources are allocated successfully by the target 3GPP access device, from parameters in the handover command for the inter-RAT 3GPP handover transmitted by the source 3GPP access device, upon reception of the handover command for the inter-RAT 3GPP handover; and to determine the IP flows to be moved, from the bearers for which resources are allocated unsuccessfully by the target 3GPP access device and the bearers for which resources are allocated successfully by the target 3GPP access device.

8. The device according to claim 7, wherein the processor configured to execute the computer readable program codes to determine the IP flows to be moved, from the hearers for which resources are allocated unsuccessfully by the target 3GPP access device and the bearers for which resources are allocated successfully by the target 3GPP access device is further configured to execute the computer readable program codes:
   to determine IP flows which can be moved to the accessed WLAN among the IP flows transmitted over the bearers for which resources are allocated unsuccessfully by the target 3GPP access device, as the IP flows to be moved; and/or to determine IP flows which can be moved to the accessed WLAN and for which the WLAN access has higher priorities than a target 3GPP access among IP flows transmitted over the bearers for which resources are allocated successfully by the target 3GPP access device, as the IP flows to be moved.

9. The device according to claim 6, wherein the processor is further configured to execute the computer readable program codes:
   to determine 3GPP access information, WLAN access information, IP flow information and an Access Network Discovery and Selection Function (ANDSF) policy, upon reception of the handover command for the inter-RAT 3GPP handover transmitted by the source 3GPP access device; and to determine the IP flows to be moved, from the 3GPP access information, the WLAN access information, the IP flow information and the ANDSF policy.

10. The device according to claim 9, wherein the processor configured to execute the computer readable program codes to determine the IP flows to be moved, from the 3GPP access information, the WLAN access information, the IP flow information and the ANDSF policy is further configured to execute the computer readable program codes:
   to determine IP flows for which the WLAN access has higher priorities than a target 3GPP access, from the 3GPP access information, the WLAN access information, the IP flow information and the ANDSF policy, as the IP flows to be moved; and/or to determine IP flows for which the WLAN access has lower priorities than the target 3GPP access and matched for transmission over bearers for which resources are allocated unsuccessfully by a target 3GPP access device, from the 3GPP access information, the WLAN access information, the IP flow information and the ANDSF policy, as the IP flows to be moved.

* * * * *